Nov. 26, 1935.  L. J. HARTLEY  2,022,505
TRANSMISSION OF SOUND AND PICTURES
Filed Nov. 22, 1929

Inventor:
Lowell J. Hartley,
by Charles O. Muller
His Attorney.

Patented Nov. 26, 1935

2,022,505

UNITED STATES PATENT OFFICE 2,022,505

TRANSMISSION OF SOUND AND PICTURES

Lowell J. Hartley, Schenectady, N. Y., assignor to General Electric Company, a corporation of New York Application November 22, 1929, Serial No. 409,128

3 Claims. (Cl. 178—6)

My invention relates to the transmission of sound and pictures and has for its principal object the provision of an improved apparatus and method of operation whereby pictures may be produced at a speed which is different from that which would ordinarily be maintained when a combined sound and moving picture record is moved at the speed required for the production of sound.

Where sound and pictures are recorded on the same record it is essential for satisfactory sound production that the record be moved at a certain speed, for example, a speed, about twenty-four pictures per second. In the transmission of pictures it is sometimes desirable to transmit the pictures at speeds other than the speed required for satisfactory sound production but in order to produce satisfactory sound the film must travel at a predetermined speed. These conflicting requirements between picture and sound transmission have usually been solved in the past by moving the film at a speed which is intermediate that most suitable for picture production and most suitable for sound production. Under these conditions neither the pictures produced nor the sound produced are altogether satisfactory. In accordance with my invention, this difficulty is avoided by moving the scanning element either in the same direction or in the opposite direction to the direction of motion of the record. Thus if the number of pictures desired is greater than that produced by moving the film at the speed required for good sound production, the scanning spot is moved in the opposite direction to the direction of motion of the film and certain pictures are scanned twice to produce the required additional number of pictures. If the number of pictures required is less than that corresponding to the rate of film movement required for good sound production, the scanning spot is moved in the same direction as the film and certain pictures are skipped or not scanned.

My invention will be better understood from the following description when considered in connection with the accompanying drawing, and its scope will be pointed out in the appended claims.

Figure 1:
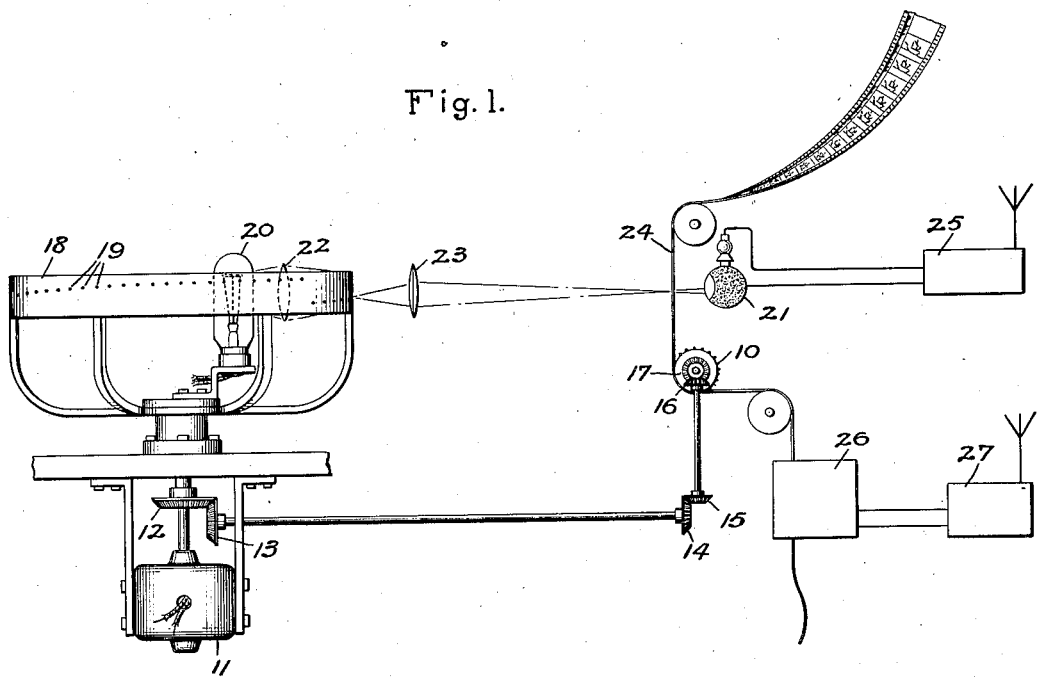
Figure 2:
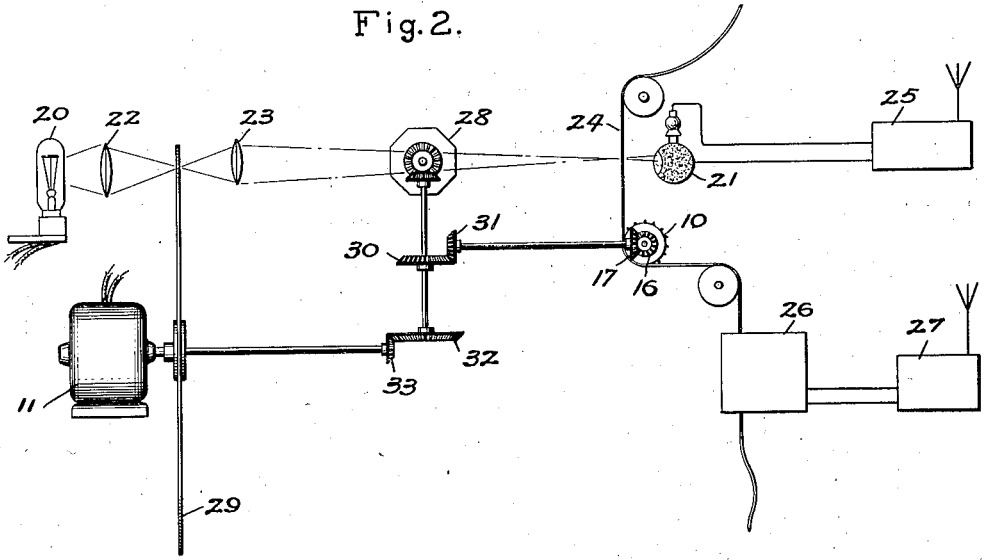

Referring to the drawing, Figs. 1 and 2 illustrate different types of apparatus wherein my invention has been embodied.

The apparatus illustrated by Fig. 1 includes a film-moving wheel 10 which is coupled to a driving motor 11 through gears 12, 13, 14, 15, 16, and 17. The motor 11 is also coupled to a rotatable member 18 provided with a plurality of spirally-arranged openings 19. Light from a suitable source 20 is projected into the opening of a light sensitive cell 21 through a lens 22, the spirally arranged openings 19, lens 23, and the sound and picture record bearing member 24. The light sensitive cell 21 is connected to the input circuit of a radio transmitter 25, from which the picture signals are transmitted.

The film 24 also passes through a sound pickup device 26, which is connected to the input circuit of a radio transmitter 27 from which the sound signals are transmitted.

The apparatus illustrated by Fig. 2 is similar in its operation to that illustrated by Fig. 1. It differs therefrom in that a revolving prism 28 is coupled to the driving motor 11 and a perforated disc 29 is interposed between the lenses 22 and 23. In this embodiment of the invention the film-driving wheel 10 is coupled to the driving motor 11 through gears 16 and 17 and through gears 30 to 33. The perforations of the disc 29 are arranged in a circle and serve to carry the scanning beam transversely of the film 24 while the prism functions to move the scanning beam either in the same direction or in a direction opposite to that of the film movement, depending on whether it is desired to produce a greater or less number of pictures than that corresponding to the film speed required for satisfactory sound conduction.

The operation of the apparatus illustrated by Fig. 1 will be readily understood without detailed explanation. If the perforations 19 in the member 18 were arranged parallel to the upper and lower edges of this member, the scanning beam would traverse the film 24 in a direction perpendicular to its edges, and the rate of picture production would correspond exactly to the rate at which the film is moved. Due to the fact that the perforations 19 are arranged in a spiral, the scanning beam moves either in the same direction or in the opposite direction to the film. When the scanning beam moves in the opposite direction to the film, certain pictures are scanned twice and the number of pictures produced per second is increased over what it would be if the scanning beam were moved in a direction perpendicular to the edges of the film. If the apparatus is so arranged and operated that the scanning beam moves in the same direction as that in which the film moves, certain of the pictures are not scanned and the total number of pictures produced per second is reduced.

The operation of the apparatus illustrated by Fig. 2 is similar in all respects to that of Fig. 1, the disc 29 serving to move the scanning beam transversely of the film and the prism 28 serving to move the beam either in the direction of film movement or in the opposite direction.

Pertaining to Fig. 1 it will of course be understood that the pitch of the spirally arranged openings 19 (Fig. 1) is such that the scanning spot will travel with or against the direction of film travel until it has passed the width of one frame or picture or some integral multiple of one frame or picture relative to a stationary object, and will then drop back to its original position, where it is ready to start a new cycle. Also, it will be understood that the angle between adjacent faces of the prism 28 and its distance from the picture record will be such that the scanning spot will move with or against the direction of film travel until it has passed the width of one frame or picture, or some integral multiple of one frame or picture relative to a stationary object, and will then drop back to its original position, where it is ready to start a new cycle.

As a result of this construction it will be seen that although the same total length of film passes through the picture and sound apparatus in a given time, the rate of scanning the pictures, namely the number of pictures per second scanned, is greater or less than the rate at which the sound record is scanned. I desire it to be understood that in the claims where I refer to the speed of scanning the moving picture record I mean the total aggregate number of pictures scanned in a given time including duplicate scanning of some pictures or fractions of pictures, hence the rate of progress of the scanning beam longitudinally of the film.

What I claim as new and desire to secure by Letters Patent of the United States, is:

1. Apparatus for scanning a film having a motion picture record thereon comprising means for moving the record at a uniform speed, a light source, a rotatable member having a circular series of light apertures therein through each of which a light beam from said source is moved across said record and a pivotally mounted member in the path of said beam for causing the beam to advance longitudinally of the record.

2. Apparatus for scanning a film having a motion picture record thereon comprising means for engaging the film to move it at a uniform speed, a light source, a rotatable disk having a circular series of light apertures therein arranged between the light source and the film to cause the scanning beam to sweep across the film, a light deflecting member in the light path between the disk and the film and means for rotating the member to cause the beam to advance longitudinally of the film at a rate other than that of the film advance.

3. Apparatus for scanning a film having a motion picture record thereon comprising means for engaging the film to move it at a uniform speed, a light source, a rotatable disk having a circular series of light apertures therein arranged between the light source and the film to cause the scanning beam to sweep across the film, a rotatable prism between the disk and the film for moving the beam longitudinally of the film and a common driving means for said film engaging means, said disk, and said prism.

LOWELL J. HARTLEY.